(12) United States Patent
Hayashi

(10) Patent No.: US 6,674,615 B2
(45) Date of Patent: Jan. 6, 2004

(54) MAGNETO-RESISTANCE EFFECT HEAD AND MAGNETIC STORAGE DEVICE EMPLOYING THE HEAD

(75) Inventor: Kazuhiko Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 166 days.

(21) Appl. No.: 09/734,615

(22) Filed: Dec. 13, 2000

(65) Prior Publication Data

US 2001/0005300 A1 Jun. 28, 2001

(30) Foreign Application Priority Data

Dec. 14, 1999 (JP) .......................... 11-354261

(51) Int. Cl.$^7$ ................................ G11B 5/39
(52) U.S. Cl. ..................... 360/317; 360/324.2
(58) Field of Search ................. 360/317, 324.11, 360/234.2, 319

(56) References Cited

U.S. PATENT DOCUMENTS

| | | | |
|---|---|---|---|
| 5,896,252 A | 4/1999 | Kanai ..................... | 360/324.12 |
| 6,019,582 A | * 7/2000 | Komuro et al. ............. | 360/119 |
| 6,108,177 A | * 8/2000 | Gill ........................ | 360/324.12 |
| 6,327,107 B1 | * 12/2001 | Komuro et al. ........... | 360/324.2 |
| 6,333,842 B1 | * 12/2001 | Nobuyuki et al. .......... | 360/319 |
| 6,344,954 B1 | * 2/2002 | Redon et al. ............... | 360/321 |

FOREIGN PATENT DOCUMENTS

| | | |
|---|---|---|
| EP | 98112888.7 | 7/1998 |
| JP | 2-61572 | 3/1990 |
| JP | 4-358310 | 12/1992 |
| JP | 09-305930 | 11/1997 |
| JP | 10-255231 | 9/1998 |
| JP | 08310568 | 12/1998 |
| JP | 11-175920 | 7/1999 |
| JP | 11-213351 | 8/1999 |

OTHER PUBLICATIONS

D. Thompson et al., "Thin Film Magnetoresistors in Memory, Storage, and Related Applications", IEEE Transactions on Magnetics, vol. MAG–11, No. 4, Jul. 1975.

\* cited by examiner

Primary Examiner—Brian E. Miller
(74) Attorney, Agent, or Firm—Whitham, Curtis & Christofferson, P.C.

(57) ABSTRACT

A magneto-resistance effect head (MR head) is provided, wherein a lower electrode-cum-magnetic shield layer is provided on a substrate, a magnetic gap adjusting layer is provided thereon, a magneto-resistance effect element (MR element) is provided on the magnetic gap adjusting layer, and an upper electrode-cum-magnetic shield layer is provided on the MR element. A pair of vertical bias layers is provided at both sides of the MR element. In the MR element, a lower layer, a free magnetic layer, a nonmagnetic layer, a fixed magnetic layer, and a fixing layer are provided in order from the magnetic gap adjusting layer side. By providing the magnetic gap adjusting layer between the lower electrode-cum-magnetic shield layer and the free magnetic layer, the free magnetic layer can be made to be sufficiently separate from the lower electrode-cum-magnetic shield layer. Thereby, since a sufficient leak magnetic field can be applied to the free magnetic layer, the head reproduction output is improved.

8 Claims, 8 Drawing Sheets

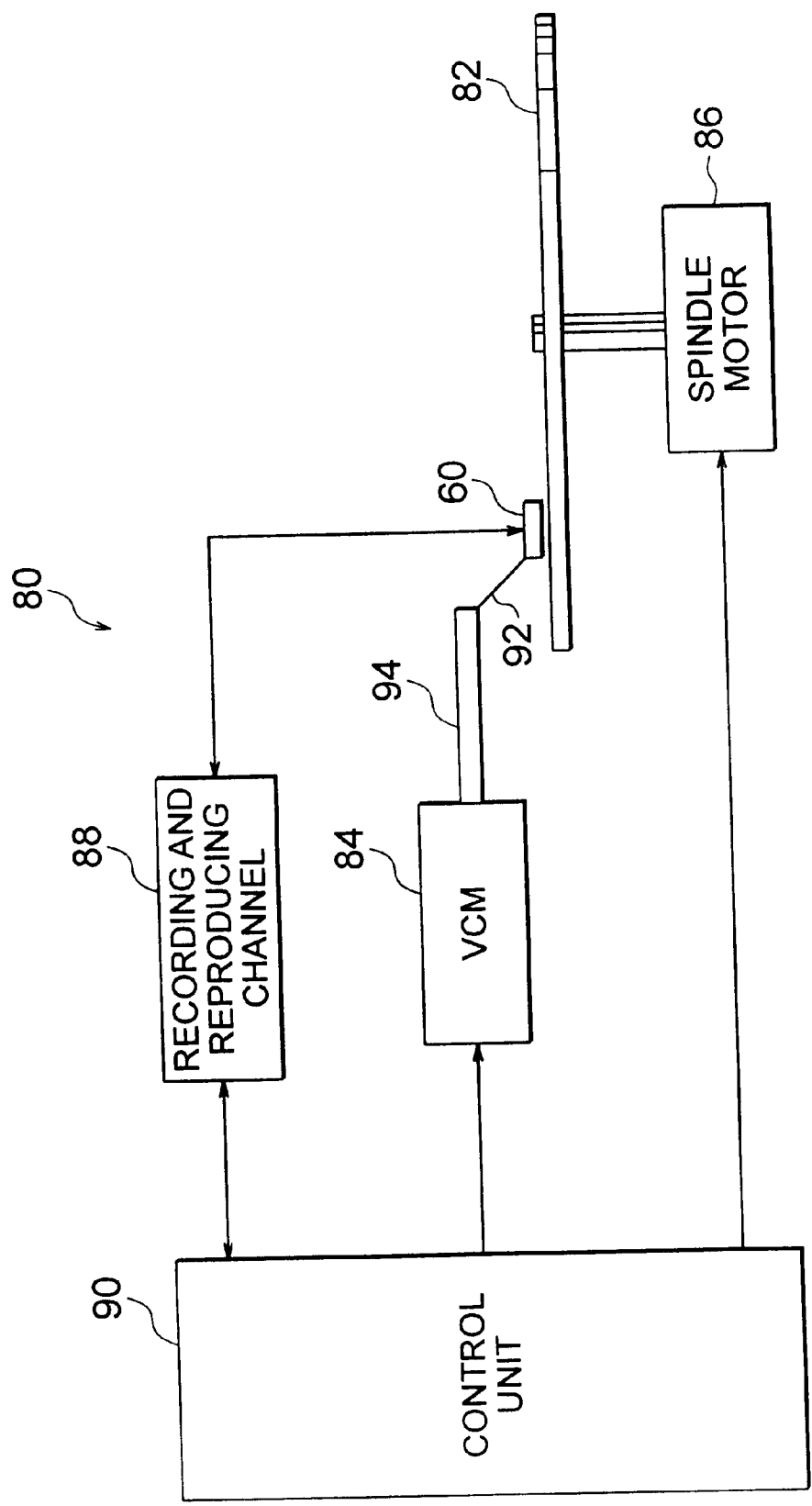

MAGNETO-RESISTANCE EFFECT HEAD AND MAGNETIC STORAGE DEVICE EMPLOYING THE HEAD

BACKGROUND OF THE INVENTION

1. Field of the Invention

The present invention relates to a magneto-resistance effect head for reading information signals recorded in a magnetic recording medium, and a magnetic storage device employing the head.

2. Description of the Related Art

A magneto-resistance effect head (hereinafter, referred to as an MR head) is equipped with a magneto-resistance effect element (hereinafter, referred to as an MR element) whose electric resistance value changes as a function of the intensity and direction of a magnetic flux, and detects the electric resistance value of the MR element to detect a magnetic field signal. This MR head operates based on the anisotropic magneto-resistance effect (hereinafter, referred to as an AMR effect), and can read data from the surface of a magnetic body at a large linear density. The AMR effect is an effect that one constituent of the resistance of the MR element changes in proportion to the square of the cosine of the angle between the magnetization direction and the direction of the sense current flow inside the MR element. The AMR effect is explained in detail in the paper titled "Memory, Storage, and Related Applications" written by D. A. Thompson and others, IEEE Trans. on Mag. MAG-11, P1039 (1975).

In the MR head using the AMR effect, in order to suppress Barkhausen noise, a vertical bias magnetic field is applied in many cases. As a material for a vertical bias layer for applying the vertical bias magnetic field, antiferromagnetism materials such as FeMn, NiMn, and Nickel oxide are used.

Furthermore, recently, a more conspicuous magneto-resistance effect has been found wherein changes in the resistance of the MR element are dependent on the spin-dependent transmission of conductible electrons between magnetic layers interposed by a nonmagnetic layer and spin-dependent scattering at the layer interface accompanying the transmission. This magneto-resistance effect is known by various names such as "Giant magneto-resistance effect" or "Spin-valve effect". Since such an MR element has greater changes in the resistance accompanying changes in the magnetic field than that of the MR element using the AMR effect, the sensitivity is improved. In this MR element, the resistance within a plane between a pair of ferromagnetic layers separated by a nonmagnetic layer changes in proportion to the cosine of the angle between the magnetization directions of the two ferromagnetic layers.

For example, in Japanese Patent Application Laid-open No. 2(1990)-61572, a lamination magnetic structure is disclosed for the purpose of realizing high MR changes by making the magnetization directions alternately in reverse to each other and in parallel with each other inside the magnetic layers due to the spin-valve effect. As materials that can be used in this lamination structure, ferromagnetic transition metals and alloys are proposed in the Application. Furthermore, a lamination structure whereby one of at least two ferromagnetic layers separated by a middle layer is provided with a fixing layer for fixing the magnetization direction of the ferromagnetic layer, and a lamination structure whereby the FeMn is used as a material for the fixing layer are disclosed.

In addition, in Japanese Patent Application Laid-open No. 4(1992)-358310, for the purpose of improving the sensitivity of the MR element upon adding the AMR effect and the spin-valve effect, an MR element is disclosed, which has two ferromagnetic thin layers separated by a nonmagnetic metal thin layer, and in which the magnetization directions of the two ferromagnetic thin layers become orthogonal to each other in the case where an applied magnetic field is zero. The resistance between the two ferromagnetic layers changes in proportion to the cosine of the angle between the magnetization directions of the two ferromagnetic layers due to the spin-valve effect, which has no connection with the direction of current flowing inside the MR element.

However, in these prior-arts, since the composition of the MR element is so complicated that reduction in size of the MR element is limited, and therefore, it is difficult to improve the recording bit density.

Therefore, in Japanese Patent Application Laid-open No. 11(1999)-175920, in an MR compound head employing a ferromagnetic tunnel joint, a structure is disclosed, in which the lower magnetic shield is simultaneously used as the lower electrode, and the upper magnetic shield is simultaneously used as the upper electrode. In accordance with omission of the upper and lower magnetic gap that results from simultaneous use of the lower magnetic shield as the lower electrode and the upper magnetic shield as the upper electrode, the space between the upper and lower magnetic shields can be narrowed. Therefore, the recording bit density can be improved in principle.

However, there are problems in the structure disclosed in Japanese Patent Application Laid-open No. 11(1999)-175920 as follows. An MR element using the spin valve effect or ferromagnetic tunnel joint has a basic component in which a fixing layer, a fixed magnetic layer, a nonmagnetic layer or insulation barrier layer, and a free magnetic layer are laminated in this order, wherein the free magnetic layer is disposed at the end part of the basic component. Since magnetic shields are provided at both sides of this basic component, the free magnetic layer is directly contacted with the magnetic shield or disposed at a distance close to the shield via a thin protection layer. Therefore, a leak magnetic field from a magnetic recording medium that flows into the free magnetic layer as a magnetism sensing portion is absorbed by the magnetic shields and becomes smaller. Furthermore, a static magnetic field and a sense current magnetic field generated from the magnetic layers comprising the MR element are also absorbed by the magnetic shields, and the bias point of the MR element easily deviates from the designed value.

The abovementioned problems are solved to some degree if the lower magnetic shield layer or upper magnetic shield layer contacted with the free magnetic layer is made to be sufficiently thick. However, in such a case, in the process of manufacturing the MR head, the patterning of the thick lower magnetic shield layer or thick upper magnetic shield layer is carried out together with the basic component portion comprised of the fixing layer, fixed magnetic layer, nonmagnetic layer or insulation layer, and free magnetic layer. Therefore, in a case where the upper magnetic shield layer is made thick, the milling depth when patterning increases, so that control becomes difficult. When the lower magnetic shield layer is made thick, re-adhering matter occurred when milling of the lower magnetic shield layer increases, so that it is easier for the fixed magnetic layer and free magnetic layer to become short-circuited. In a case where the patterning of the upper magnetic layer and the patterning of the basic component portion are carried out in different processes and the upper shield pattern is formed to be smaller than the pattern of the basic component portion, if anything, the form of the MR element becomes wrong and the element characteristics deteriorate since the patterning of only the upper magnetic shield layer is difficult.

SUMMARY OF THE INVENTION

An object of the present invention is to improve reproduction performance of an MR head having two electrodes-cum-magnetic shield layers without increasing the thickness of the electrodes-cum-magnetic shield layers.

A magneto-resistance effect head according to the present invention comprises a magneto-resistance effect element which has a free magnetic layer, the magnetization direction of which changes depending on applied magnetic fields, a nonmagnetic layer, a fixed magnetic layer, the magnetization direction of which is fixed, and a fixing layer for fixing the magnetization direction of said fixed magnetic layer, and the resistance value of the magneto-resistance effect element changes depending on applied magnetic fields. Also, the magneto-resistance effect head has a first electrode-cum-magnetic shield layer which is disposed at the free magnetic layer side of the magneto-resistance effect element and functions as an electrode and a magnetic shield of the magneto-resistance effect element, a second electrode-cum-magnetic shield layer which is disposed at the fixing layer side of the magneto-resistance effect element and functions as an electrode and a magnetic shield of the magneto-resistance effect element, and a magnetic gap adjusting layer which is made of a non magnetic conductor and provided between the free magnetic layer and first electrode-cum-magnetic shield layer. The first and second electrodes-cum-magnetic shield layers, free magnetic layer, nonmagnetic layer, fixed magnetic layer, and fixing magnetic layer are laminated in one direction.

In the present invention, without contacting the electrodes-cum-magnetic shield layer and the free magnetic layer, a magnetic gap adjusting layer is provided between them, whereby the free magnetic layer which is a magnetism sensing portion for leak magnetic fields can be spatially separated from the electrodes-cum-magnetic shield layer. Thereby, since sufficient leak magnetic fields flow into the free magnetic layer, the reproduction sensitivity is increased and the reproduction output is improved. In addition, the shield proximity effect on the magnetostatic coupling between the free magnetic layer and fixed magnetic layer and sense current can be eliminated, so that design of the bias structure to provide an optimum operating point becomes easier. As a result, an output waveform having excellent waveform symmetry without distortion can be obtained.

Also, in the present invention, provision of two electrodes-cum-magnetic shield layers which function both as electrode layers and magnetic shield layers allows high recording density, and the manufacturing yield is excellent since the thickness of the electrodes-cum-magnetic shield layers are not increased.

A protection layer may be interposed between the free magnetic layer and magnetic gap adjusting layer. The protection layer is called an undercoat layer or upper base layer, and is provided for the purpose of improving adhesion. Furthermore, as the nonmagnetic layer, an insulation barrier layer may be used to form a tunnel joint layer.

Another magneto-resistance effect head according to the present invention comprises a lower electrode-cum-magnetic shield layer, a magnetic gap adjusting layer which is made of a nonmagnetic conductor and formed on the lower electrode-cum-magnetic shield layer, a pair of vertical bias layers formed on the magnetic gap adjusting layer with interposition of a space, a free magnetic layer which is formed in the space on the magnetic gap adjusting layer so that both ends are contacted with the vertical bias layers, and changes its magnetization direction depending on applied magnetic fields, a nonmagnetic layer formed on the free magnetic layer, a fixed magnetic layer formed on the nonmagnetic layer, the magnetization direction of which is fixed, a fixing layer which is formed on the fixed magnetic layer to fix the magnetization direction of the fixed magnetic layer, an insulation layer formed so as to fill the surrounding of the fixed magnetic layer and fixing layer, and an upper electrode-cum-magnetic shield layer formed on the insulation layer and fixing layer.

Still another magneto-resistance effect head according to the present invention comprises a lower electrode-cum-magnetic shield layer, a fixing layer formed on the lower electrode-cum-magnetic shield layer, a fixed magnetic layer which is formed on the fixing layer and whose magnetization direction is fixed by the fixing layer, a nonmagnetic layer formed on the fixed magnetic layer, a free magnetic layer which is formed on a part of the nonmagnetic layer and changes its magnetization direction depending on applied magnetic fields, an insulation layer formed so as to fill the surrounding of the free magnetic layer, a pair of vertical bias layers which is formed on the insulation layer so as to be contacted with both ends of the free magnetic layer and applies a magnetic field to the free magnetic layer, a magnetic gap adjusting layer which is formed on the pair of vertical bias layers and free magnetic layer and composed of a nonmagnetic conductor, and a upper electrode-cum-magnetic shield layer formed on the magnetic gap adjusting layer.

The magnetic storage device according to the present invention comprises a magnetic recording medium, a magneto-resistance effect head for reproducing information recorded in the magnetic recording medium, an inductive head for recording information onto the magnetic recording medium, an actuator for positioning a magnetic head comprised of the magneto-resistance effect head and inductive head on the magnetic recording medium, and a control unit for controlling the actuator and magnetic head. In addition, the magneto-resistance effect head comprises a magneto-resistance effect element, which has a free magnetic layer, the magnetization direction of which changes depending on applied magnetic fields, a nonmagnetic layer, a fixed magnetic layer, the magnetization direction of which is fixed, and a fixing layer for fixing the magnetization direction of the fixed magnetic layer, and whose resistance changes depending on applied magnetic fields. The magneto-resistance effect head comprises a first electrode-cum-magnetic shield layer which is disposed at the free magnetic layer side of the magneto-resistance effect element and functions as an electrode and a magnetic shield of the magneto-resistance effect element, a second electrode-cum-magnetic shield layer which is disposed at the fixing layer side of the magneto-resistance effect element and functions as an electrode and a magnetic shield of the magneto-resistance effect element, and a magnetic gap adjusting layer which is made of a nonmagnetic conductor and provided between the free magnetic layer and first electrode-cum-magnetic shield layer. The first and second electrodes-cum-magnetic shield layers, free magnetic layer, nonmagnetic layer, fixed magnetic layer, and fixing layer are laminated in one direction.

BRIEF DESCRIPTION OF THE DRAWINGS

FIG. 3 is a block diagram showing the construction of the magnetic storage device using the magnetic recording and reproducing head shown in FIG. 2.

DETAILED DESCRIPTION OF THE PREFERRED EMBODIMENTS

Figure 1:
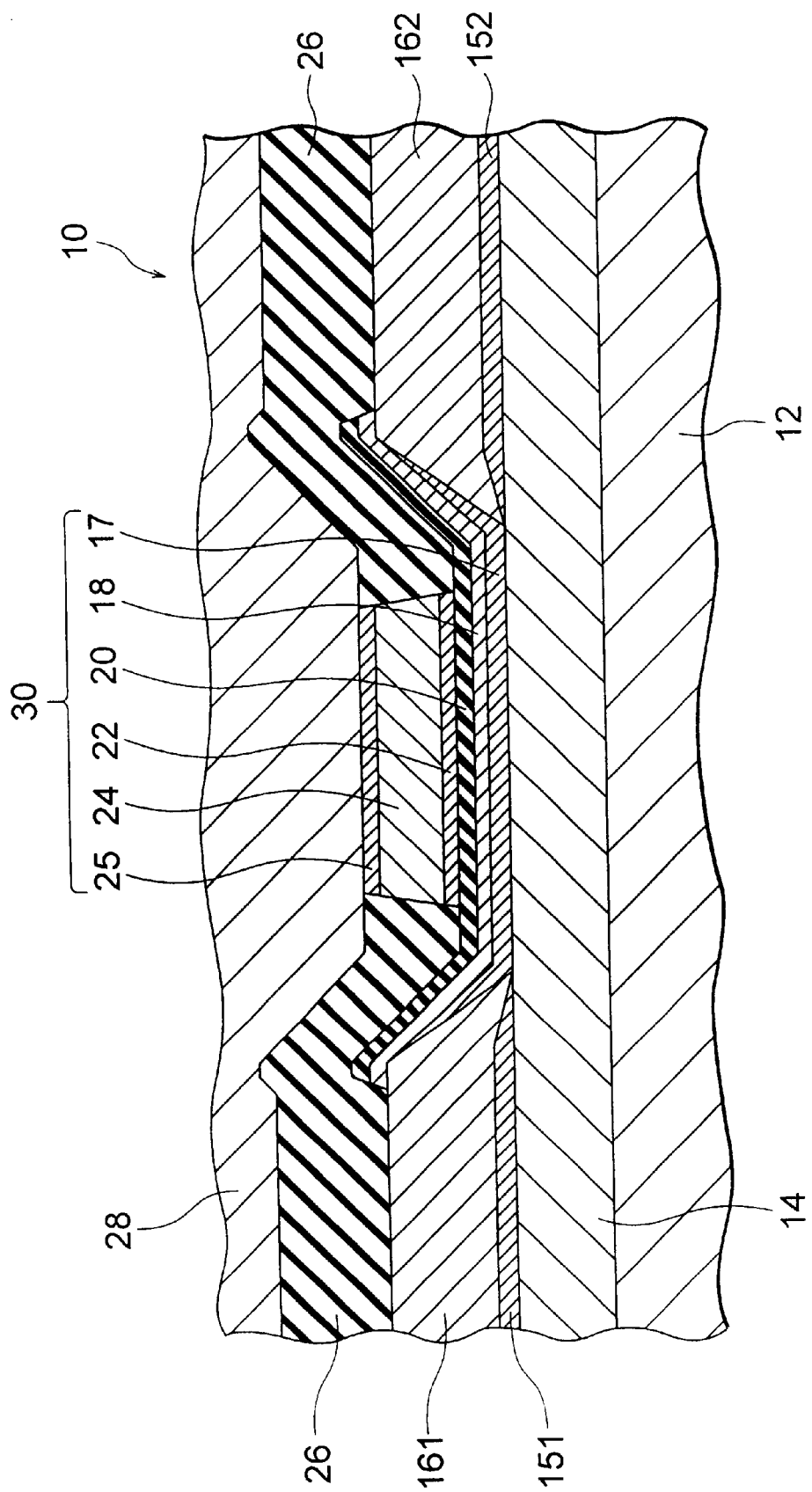
FIG. 1 is a sectional view in parallel with the ABS showing the construction of the MR head according to the first embodiment of the present invention.

Hereinafter, the embodiments of the magneto-resistance effect head and the magnetic storage device using the head of the present invention shall be described in detail with reference to the attached drawings. First, the first embodiment of the present invention shall be described. FIG. 1 is a sectional view in parallel with the air bearing surface (hereinafter, referred to as "ABS") showing the construction of the MR head according to the embodiment. As shown in FIG. 1, in an MR head 10 of the embodiment, a lower electrode-cum-magnetic shield layer 12 is provided on a substrate 62 (see FIG. 2), a magnetic gap adjusting layer 14 made of a nonmagnetic conductor is provided on the lower electrode-cum-magnetic shield layer 12, and a pair of vertical bias layers 161 and 162 is provided on the magnetic gap adjusting layer 14 so as to be opposite to each other and interposed by a space formed between them. Vertical bias undercoat layers 151 and 152 are provided between the magnetic gap adjusting layer 14 and vertical bias layer 161 and between the magnetic gap adjusting layer 14 and vertical bias layer 162. Between the vertical bias layers 161 and 162 on the magnetic gap adjusting layer 14, a free magnetic layer 18 is provided so that both end parts are contacted with the vertical bias layers 161 and 162. The free magnetic layer 18 changes its magnetization direction depending on applied magnetic fields. In addition, an undercoat layer 17 is provided at a part between the magnetic gap adjusting layer 14 and free magnetic layer 18 and between the vertical bias layers 161, 162 and the free magnetic layer 18.

Furthermore, a nonmagnetic layer 20 is provided on the free magnetic layer 18, a fixed magnetic layer 22, the magnetization direction of which is fixed, is provided on the nonmagnetic layer 20, a fixing layer 24 for fixing the magnetization direction of the fixed magnetic layer 22 is provided on the fixed magnetic layer 22, and an upper layer 25 is provided on the fixing layer 24. Furthermore, an insulation layer 26 is provided so as to fill the surrounding of the fixed magnetic layer 22, fixing layer 24, and upper layer 25, and an upper electrode-cum-magnetic shield layer 28 is provided on the insulation layer 26 and upper layer 25. The undercoat layer 17, free magnetic layer 18, nonmagnetic layer 20, fixed magnetic layer 22, fixing layer 24, and upper layer 25 comprise an MR element 30.

In FIG. 1, the MR head is shown in which the undercoat layer 17 and free magnetic layer 18 are slightly raised on the end parts of the vertical bias layers 161 and 162, and the undercoat layer 17 and free magnetic layer 18 are not formed on the vertical bias layers 161 and 162 except for the raised portions, however, the sizes of the raised portions of the undercoat layer 17 and free magnetic layer 18 on the vertical bias layers 161 and 162 can be properly selected. In addition, the portion of the nonmagnetic layer 20 that the formed fixing layer 24 and upper layer 25 are not provided above, may not be provided. Furthermore, the film thickness of the free magnetic layer 18 at the portion without the fixed magnetic layer 22, fixing layer 24, and upper layer 25 formed above, can be made thinner than the film thickness at the portion with the fixed magnetic layer 22, fixing layer 24, and upper layer 25 formed.

The vertical bias undercoat layers 151 and 152, undercoat layer 17, and upper layer 25 can be omitted. Furthermore, in the MR element 30, MR enhanced layers in which the charge density is increased can be provided between the free magnetic layer 18 and nonmagnetic layer 20 and between the nonmagnetic layer 20 and fixed magnetic layer 22. The provision of the MR enhanced layers improves the MR ratio (magnetoresistive ratio) of the MR element 30.

Next, the materials and structures of the components of the MR head 10 shall be described in detail.

For the substrate, alumina titanium carbide, SiC, alumina, a 2-layered film composed of a layer of alumina titanium carbide and a layer of alumina, or a 2-layered film composed of a layer of SiC and a layer of alumina.

For the lower electrode-cum-magnetic shield layer, a simple substance of one kind, a mixture of two or more kinds of materials, or a multilayered film which is composed of two or more kinds of materials, selected from a group consisting of NiFe, CoZr, CoFeB, CoZrMo, CoZrNb, CoZrTa, CoHf, CoTa, CoTaHf, CoNbHf, CoHfPd, CoTaZrNb, CoZrMoNi, FeAlSi, an iron nitride-base material, MnZn ferrite, NiZn ferrite, and MgZn ferrite, is used.

For the magnetic gap adjusting layer, a simple substance of one kind, a mixture of two or more kinds of materials, or a multilayered film which is composed of two or more kinds of materials, selected from a group consisting of Au, Ag, Cu, Mo, W, Y, Pt, Ti, Zr, Hf, V, Nb, and Ta, is used.

For the upper electrode-cum-magnetic shield layer, a simple substance of one kind, a mixture of two or more kinds of materials, or a multilayered film which is composed of two or more kinds of materials, selected from a group consisting of NiFe, CoZr, CoFeB, CoZrMo, CoZrNb, CoZrTa, CoHf, CoTa, CoTaHf, CoNbHf, CoHfPd, CoTaZrNb, CoZrMoNi, FeAlSi, an iron nitride-base material, MnZn ferrite, NiZn ferrite, and MgZn ferrite, is used.

For the insulation layer, a simple substance of one kind, a mixture of two or more kinds of materials, or a multilayered film which is composed of two or more kinds of materials, selected from a group consisting of Al oxide, Si oxide, aluminum nitride, silicon nitride, and diamond-like carbon, is used.

For the vertical bias layers, a simple substance of one kind, a mixture of two or more kinds of materials, or a multilayered film which is composed of two or more kinds of materials, selected from a group consisting of CoCrPt, CoCr, CoPt, CoCrTa, FeMn, NiMn, Ni oxide, NiCo oxide, Fe oxide, NiFe oxide, IrMn, PtMn, PtPdMn, ReMn, Co ferrite, and Ba ferrite, is used.

Materials of the respective layers comprising the MR element shall be described below. For the undercoat layer, a simple substance of one kind, a mixture of two or more kinds of materials, or a multilayered film which is composed of two or more kinds of materials, selected from a group consisting of metals, oxide, and nitride, is used. Concretely, a simple substance of one kind, a mixture of two or more kinds of materials, or a multilayered film which is composed of two or more kinds of materials, selected from a group consisting of Ta, Hf, Zr, W, Cr, Ti, Mo, Pt, Ni, Ir, Cu, Ag, Co, Zn, Ru, Rh, Re, Au, Os, Pd, Nb, V, oxide, and nitride of the above substances, is used. Additional elements, Ta, Hf, Zr, W, Cr, Ti, Mo, Pt, Ni, Ir, Cu, Ag, Co, Zn, Ru, Rh, Re, Au, Os, Pd, Nb, and V can be used. There are some cases where the undercoat layer is not provided.

For the free magnetic layer, a simple substance of one kind, a mixture of two or more kinds of materials, or a multilayered film which is composed of two or more kinds of materials, selected from a group consisting of NiFe, CoFe, NiFeCo, CoFeB, CoZrMo, CoZrNb, CoZr, CoZrTa, CoHf, CoTa, CoTaHf, CoNbHf, CoHfPd, CoTaZrNb, and CoZrMoNi, is used.

For the nonmagnetic layer, oxide, nitride, a mixture of oxide and nitride, a 2-layered film of metal and oxide, a 2-layered film of metal and nitride, or a 2-layered film of a mixture of oxide and nitride and metal is used. Concretely, a simple substance of one kind, a mixture of two or more kinds of materials, or a multilayered film which is composed of two or more kinds of materials is expected as a candidate of the material for the nonmagnetic layer, which is composed of materials selected from a group consisting of metals, oxides, and nitrides of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Pt, and Ni.

For the MR enhanced layers, a simple substance of one kind, a mixture of two or more kinds of materials, or an amorphous magnetic material is used, which is composed of materials selected from a group consisting of Co, NiFeCo, FeCo, CoFeB, CoZrMo, CoZrNb, CoZr, CoZrTa, CoHf, CoTa, CoTaHf, CoNbHf, CoHfPd, CoTaZrNb, and CoZrMoNi. If the MR enhanced layers are provided, the MR ratio increases in comparison with the case where the MR enhanced layers are not provided. On the other hand, in the case where the MR enhanced layers are not provided, the number of processes required for manufacturing is reduced.

For the fixed magnetic layer, NiFe, CoFe, NiFeCo, FeCo, CoFeB, CoZrMo, CoZrNb, CoZr, CoZrTa, CoHf, CoTa, CoTaHf, CoNbHf, CoHfPd, CoTaZrNb, and CoZrMoNi alloys or amorphous magnetic materials can be used. Or, a lamination film formed by combining these materials and a simple substance of one kind, a mixture of two or more kinds of materials, or a multilayered film which is composed of materials, selected from a group consisting of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, and Ni, can be used. For example, a multilayered film of Co, Ru, and Co, a multilayered film of CoFe, Ru, and CoFe, a multilayered film of CoFeNi, Ru, and CoFeNi, a multilayered film of Co, Cr, and Co, a multilayered film of CoFe, Cr, and CoFe, and a multilayered film of CoFeNi, Cr, and CoFeNi are probable candidates of the material.

For the fixing layer, FeMn, NiMn, IrMn, RhMn, PtPdMn, ReMn, PtMn, PtCrMn, CrMn, CrAl, TbCo, Ni oxide, Fe oxide, a mixture of Ni oxide and Co oxide, a mixture of Ni oxide and Fe oxide, a 2-layered film of Ni oxide and Co oxide, a 2-layered film of Ni oxide and Fe oxide, CoCr, CoCrPt, CoCrTa, and PtCo can be used. For example, a material composed of PtMn or PtMn added with Ti, V, Cr, Co, Cu, Zn, Y, Zr, Nb, Mo, Tc, Ru, Rh, Pd, Ag, Hf, Ta, W, Re, Os, Ir, Pt, Au, Si, Al, and Ta is a probable candidate.

For the upper layer (protection layer), metal, oxide, nitride, a mixture of oxide and nitride, a 2-layered film of metal and oxide, a 2-layered film of metal and nitride, or a 2-layered film of a mixture of oxide and nitride and metal. Concretely, a simple substance of one kind, a mixture of two or more kinds of materials, or a multilayered film which is composed of materials, selected from a group consisting of metals, oxides, and nitrides of Ti, V, Cr, Co, Cu, Zn, Y, Zr, Nb, Mo, Tc, Ru, Rh, Pd, Ag, Hf, W, Os, Ir, Pt, Au, Si, Al, Ta, Ni, or Re is a probable candidate. There are some cases where the upper layer is not provided.

Figure 2:
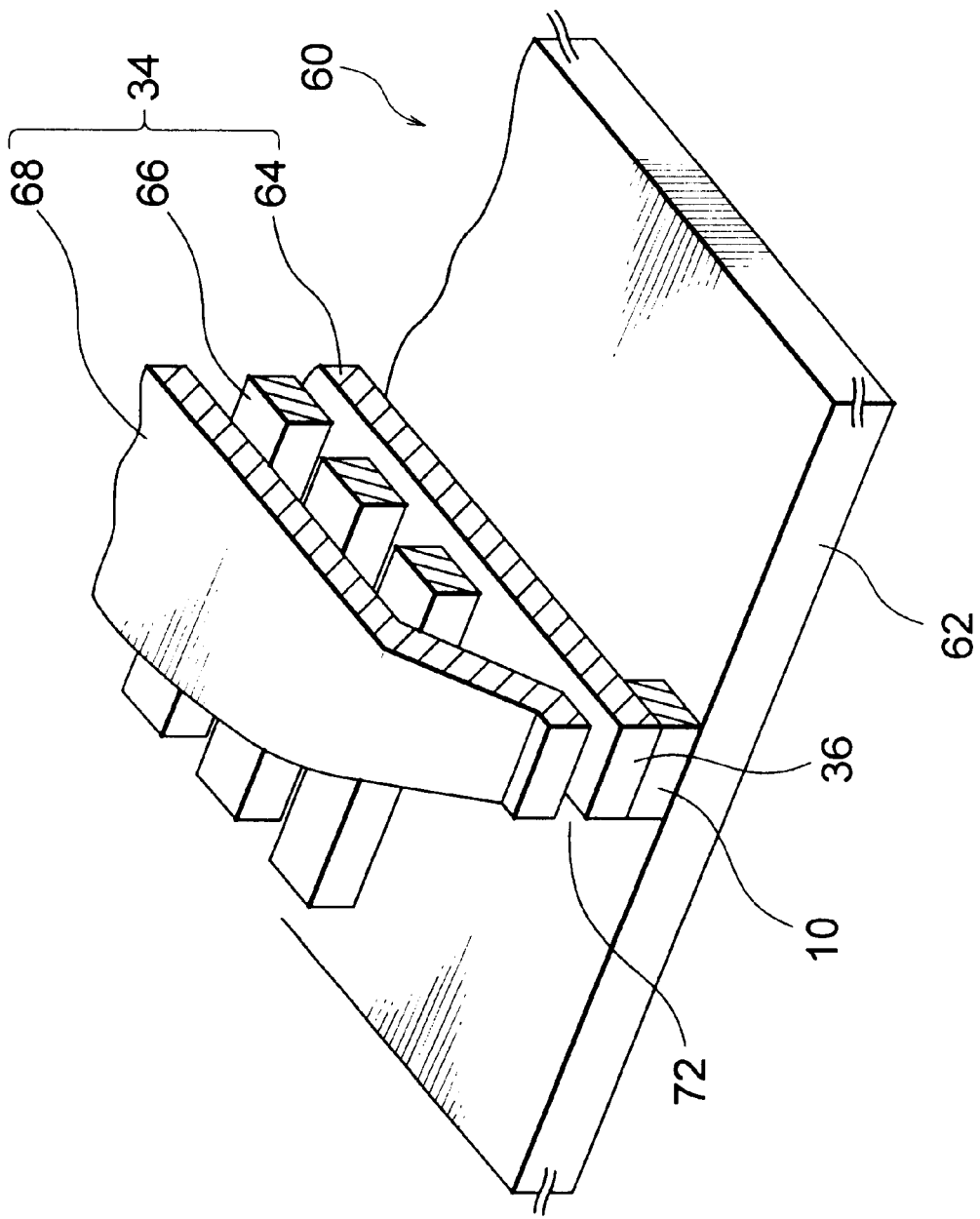
FIG. 2 is a perspective view showing the construction of the magnetic recording and reproducing head using the MR head shown in FIG. 1.

FIG. 2 is a perspective view showing the construction of a magnetic recording and reproducing head (hereinafter, referred to as a magnetic head) using the MR head shown in FIG. 1. As shown in FIG. 2, in a magnetic head 60, the MR head 10 for reproduction is provided on a substrate 62, and a recording head (interactive head) 34 comprising a lower magnetic pole 64, coils 66, and an upper magnetic pole 68 as a basic construction is provided on the MR head 10. In the recording head 34, the coils 66 are provided on the lower magnetic pole 64, the upper magnetic pole 68 is provided on the coils 66, and the lower magnetic pole 64 and upper magnetic pole 68 are disposed so as to sandwich the magnetic gap 72 at an ABS 36. At the ABS 36, the MR head 10, lower magnetic pole 64, magnetic gap 72, and upper magnetic pole 68 are arranged along one line in this order. Furthermore, the upper electrode-cum-magnetic shield layer 28 (see FIG. 1) of the MR head 10 and the lower magnetic pole 64 can be provided in a united manner or separately provided.

The magnetic head 60 writes information onto magnetic recording medium 82 (see FIG. 3) and reads information from magnetic recording medium 82. As shown in FIG. 2, the sensing portion of the MR head 10 for reproduction, and the lower magnetic pole 64, magnetic gap 72, and upper magnetic pole 68 of the recording head 34 are arranged on the same slider, whereby the simultaneous positioning on the same track can be made.

FIG. 3 is a block diagram showing the construction of the magnetic storage device relating to the embodiment. As shown in FIG. 3, in a magnetic storage device 80 of the embodiment, a magnetic recording medium 82 for recording magnetic information and a spindle motor 86 for rotating the magnetic recording medium 82 are provided, the magnetic head 60 for recording and reproducing information onto and from the magnetic recording medium 82 is provided, and a voice coil motor (VCM) 84 which is an actuator for positioning the magnetic head 60 on the magnetic recording medium 82, an arm 94 connected to the voice coil motor 84, and a suspension 92 which has one end connected to the arm 94 and the other end connected to the magnetic head 60 to suspend the magnetic head 60 is provided. The magnetic head 60 is attached to the voice coil motor 84 via the suspension 92 and arm 94 so as to face the recording surface of the magnetic recording medium 82. In addition, a recording and reproducing channel 88, which is connected to the magnetic head 60 to input and output signals into and from the magnetic head 60, is provided, and a control unit 90 for controlling the voice coil motor 84 and spindle motor 86 as well as controlling the magnetic head 60 via the recording and reproducing channel 88 is provided.

Next, a method of manufacturing the magnetic recording and reproducing head 60 in the magnetic storage device 80 of the embodiment shall be described. FIG. 4A through FIG. 4G are plan views showing the method of manufacturing the magnetic recording and reproducing head 60 of the embodiment in accordance with the order of processes. Hereinafter, description is given based on FIG. 1 and FIG. 4A through FIG. 4G.

Figure 4A:
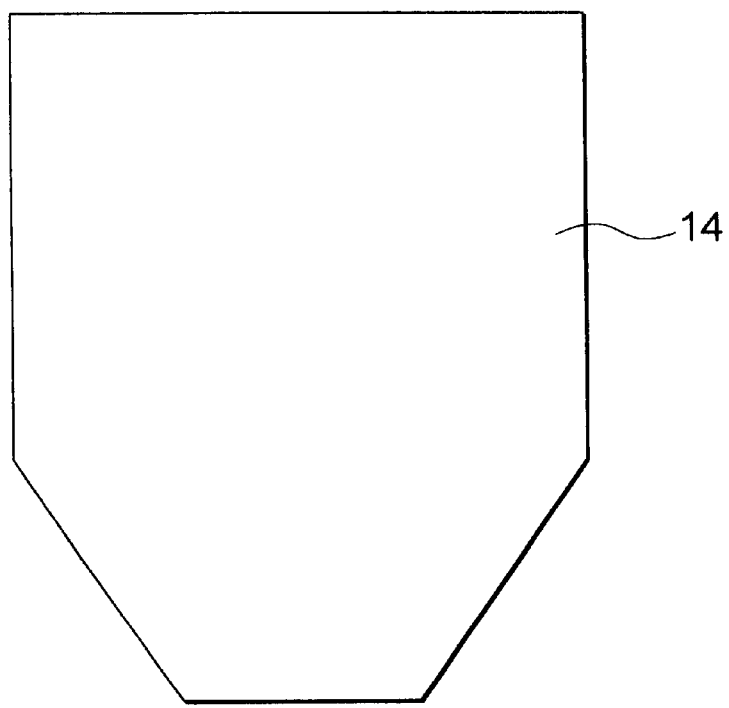
FIG. 4A is a plan view showing a method of manufacturing the lower electrode-cum-magnetic shield layer and magnetic gap adjusting layer in the magnetic recording and reproducing head according to the embodiment.

First, as shown in FIG. 4A, the lower electrode-cum-magnetic shield layer 12 (see FIG. 1) is deposited on the substrate 62 (see FIG. 2), and next, the magnetic gap adjusting layer 14 is deposited, a photoresist (hereinafter, referred to as PR) is formed thereon, and by means of milling or lifting-off, the lower electrode-cum-magnetic shield layer 12 and magnetic gap adjusting layer 14 are patterned to be hexagonal as shown in FIG. 4A.

Figure 4B:
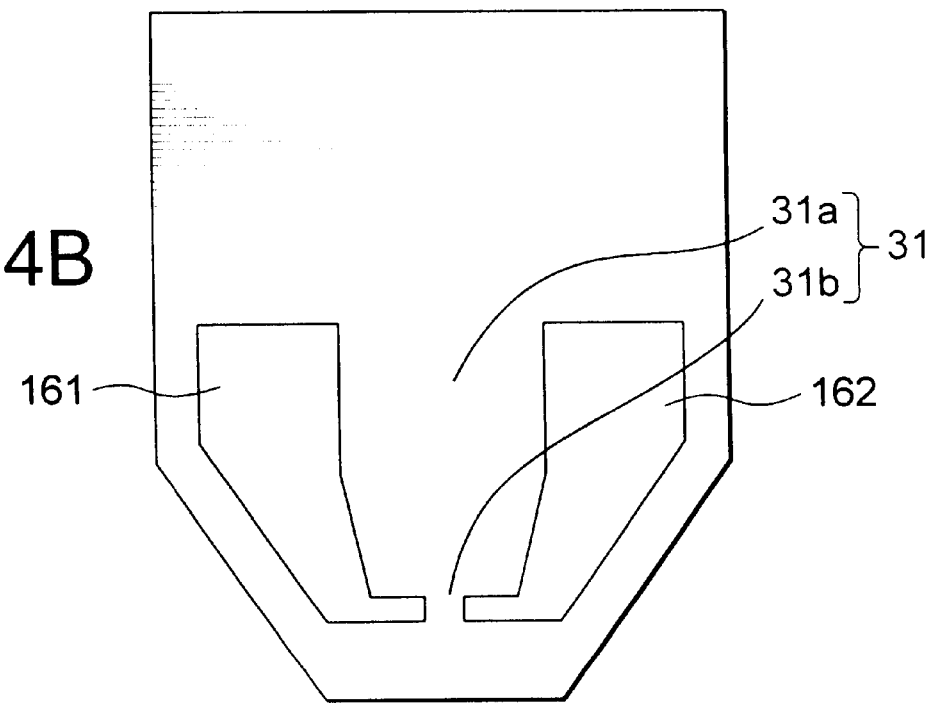
FIG. 4B is a plan view showing a method of manufacturing the vertical bias undercoat layer and vertical bias layers in the magnetic recording and reproducing head according to the embodiment.

Next, as shown in FIG. 4B, the vertical bias undercoat layers 151 and 152 (see FIG. 1) are deposited, the vertical bias layers 161 and 162 are deposited thereon, and thereafter, a PR (not shown) is formed for patterning these layers, and by using this PR as a mask, the vertical bias undercoat layer 151, vertical bias layer 161, vertical bias undercoat layer 152, and vertical bias layer 162 are milled, patterning is carried out so that the vertical bias undercoat layer 151, vertical bias layer 161 and vertical bias undercoat layer 152, vertical bias layer 162 are, respectively, opposed to each other via a space 31, and then the PR is removed. The space 31 is comprised of a wide space 31a and narrow space 31b.

Figure 4C:
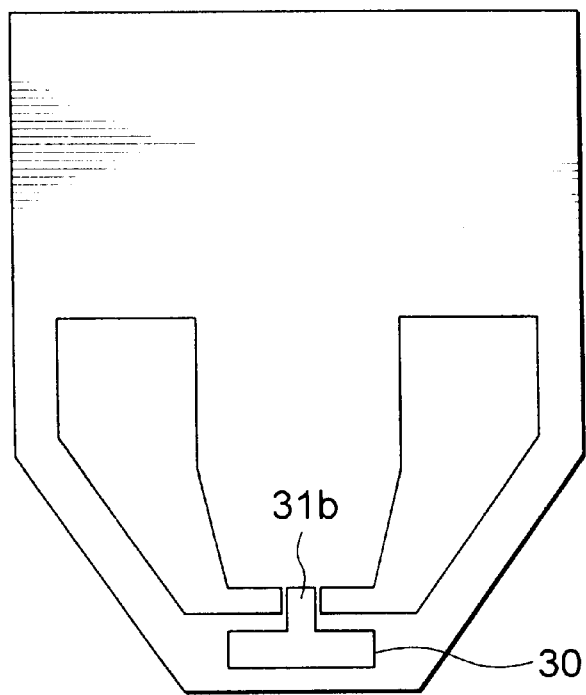
FIG. 4C is a plan view showing a method of manufacturing the MR element in the magnetic recording and reproducing head according to the embodiment.

Next, as shown in FIG. 4C, the MR element 30 is formed. That is, as shown in FIG. 1, the undercoat layer 17, free magnetic layer 18, and nonmagnetic layer 20 are formed so as to partially rise on the vertical bias layers 161 and 162. Next, the fixed magnetic layer 22, fixing layer 24, and upper layer 25 are formed in this order between the vertical bias layers 161 and 162 on the nonmagnetic layer 20, a PR is formed thereon, and the MR element 30 is patterned by means of milling. At this time, as shown in FIG. 4C, the MR element 30 is T-shaped, and a part of the MR element 30 is disposed in the narrow space 31b of the space 31. Next, the insulation layer 26 (see FIG. 1) is deposited, and the insulation layer 26 on the patterned MR element 30 is removed by means of lifting-off.

Figure 4D:
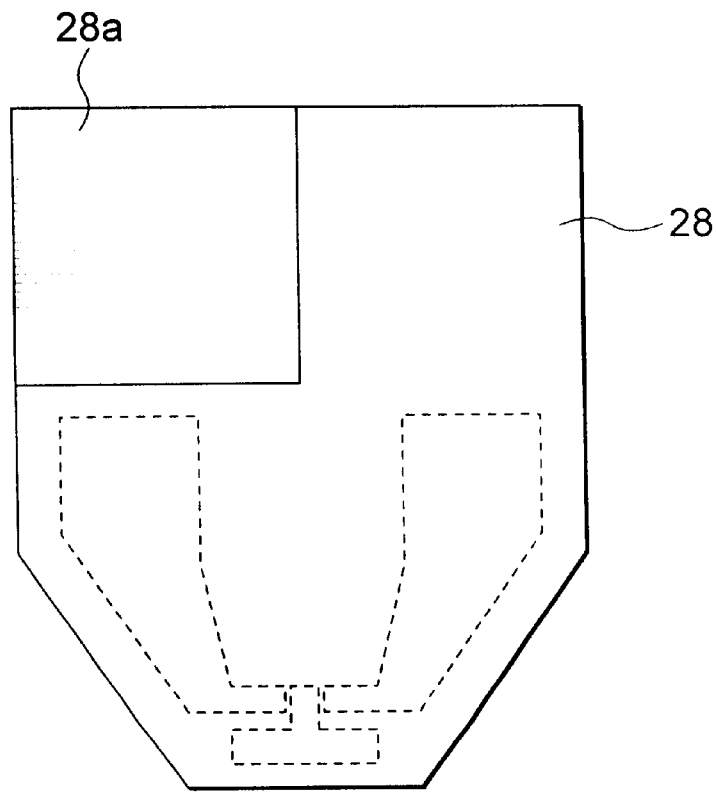
FIG. 4D is a plan view showing a method of manufacturing the upper electrode-cum-magnetic shield layer in the magnetic recording and reproducing head according to the embodiment.

Next, as shown in FIG. 4D, the upper electrode-cum-magnetic shield layer 28 is deposited, a PR is formed, and patterning is carried out. The upper electrode-cum-magnetic shield layer 28 covers the MR element 30 and vertical bias layers 161 and 162 and has an opening 28a.

Figure 4E:
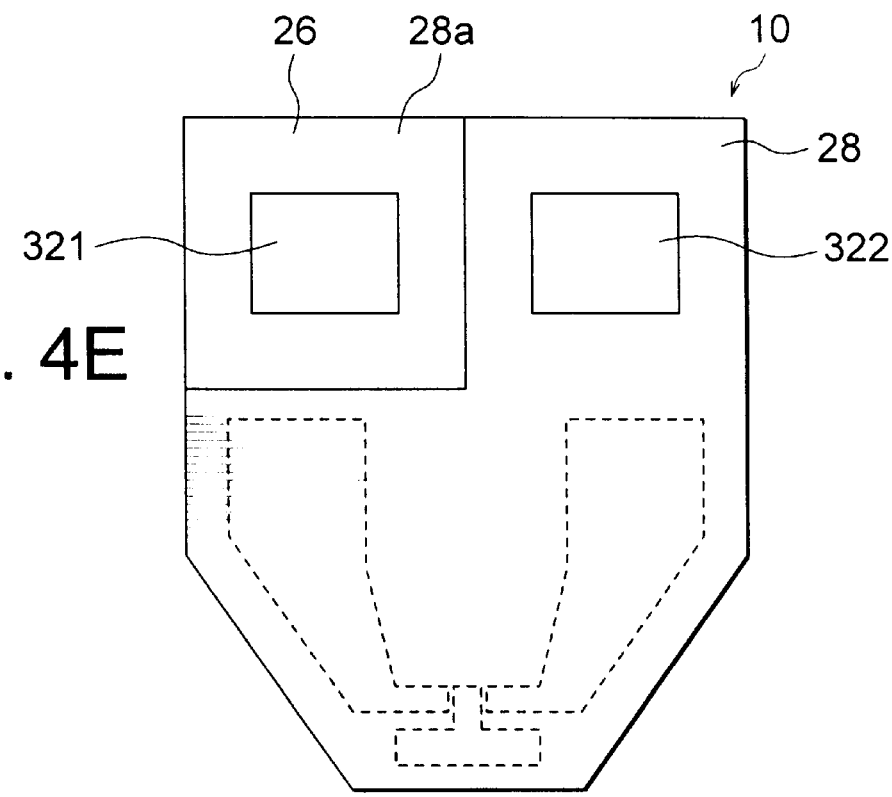
FIG. 4E is a plan view showing a method of manufacturing the upper electrode terminal and lower electrode terminal in the magnetic recording and reproducing head according to the embodiment.

Next, as shown in FIG. 4E, a PR (not shown) is formed on the upper electrode-cum-magnetic shield layer 28 and the exposed portion of the insulation layer 26 at the opening 28a. This PR has an opening on the exposed portion of the insulation layer 26. By using this PR as a mask, the insulation layer 26 and magnetic gap adjusting layer 14 (see FIG. 4a) are milled, and then, a terminal material is deposited, and by lifting-off the terminal material deposited on a portion except for the milled portion, a lower electrode terminal 321 is formed which is electrically connected to the lower electrode-cum-magnetic shield layer 12.

Next, a terminal material is deposited on the upper electrode-cum-magnetic shield layer 28, a PR (not shown) is formed, and the terminal material is patterned by means of milling, and then the PR is removed. Thereby, upper electrode terminal 322 electrically connected to the upper electrode-cum-magnetic shield layer 28 is formed. Thereby, the MR head 10 for reproduction is formed.

Figure 4F:
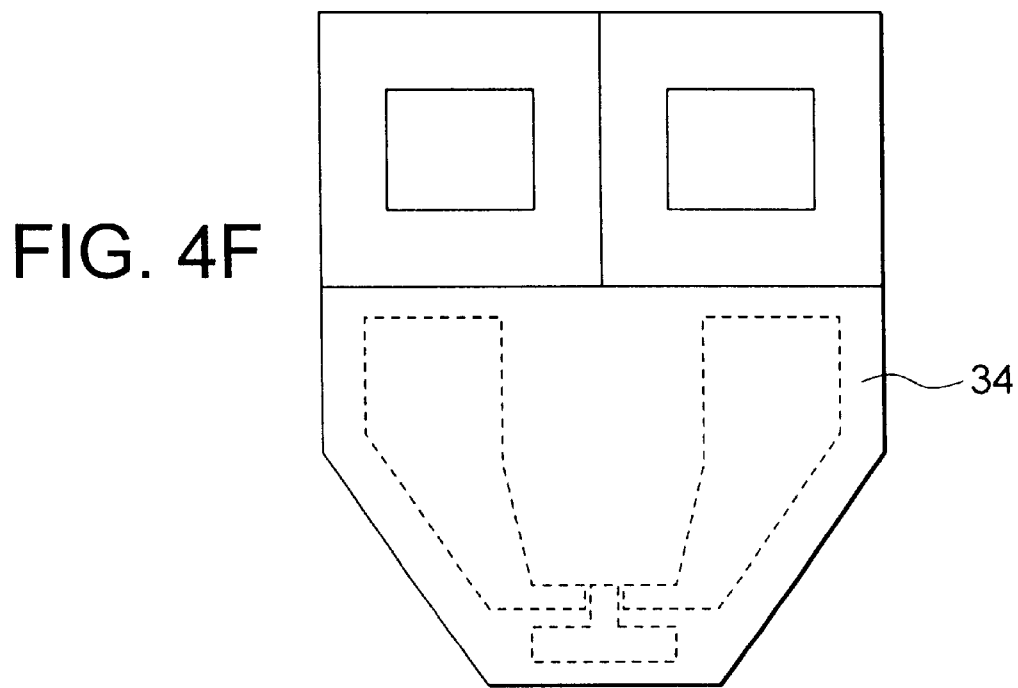
FIG. 4F is a plan view showing a method of manufacturing the recording head part in the magnetic recording and reproducing head according to the embodiment.

Next, as shown in FIG. 4F, recording head part 34 is formed. The recording head part 34 can employ any construction, so that detailed illustration thereof is omitted in the figure.

Figure 4G:
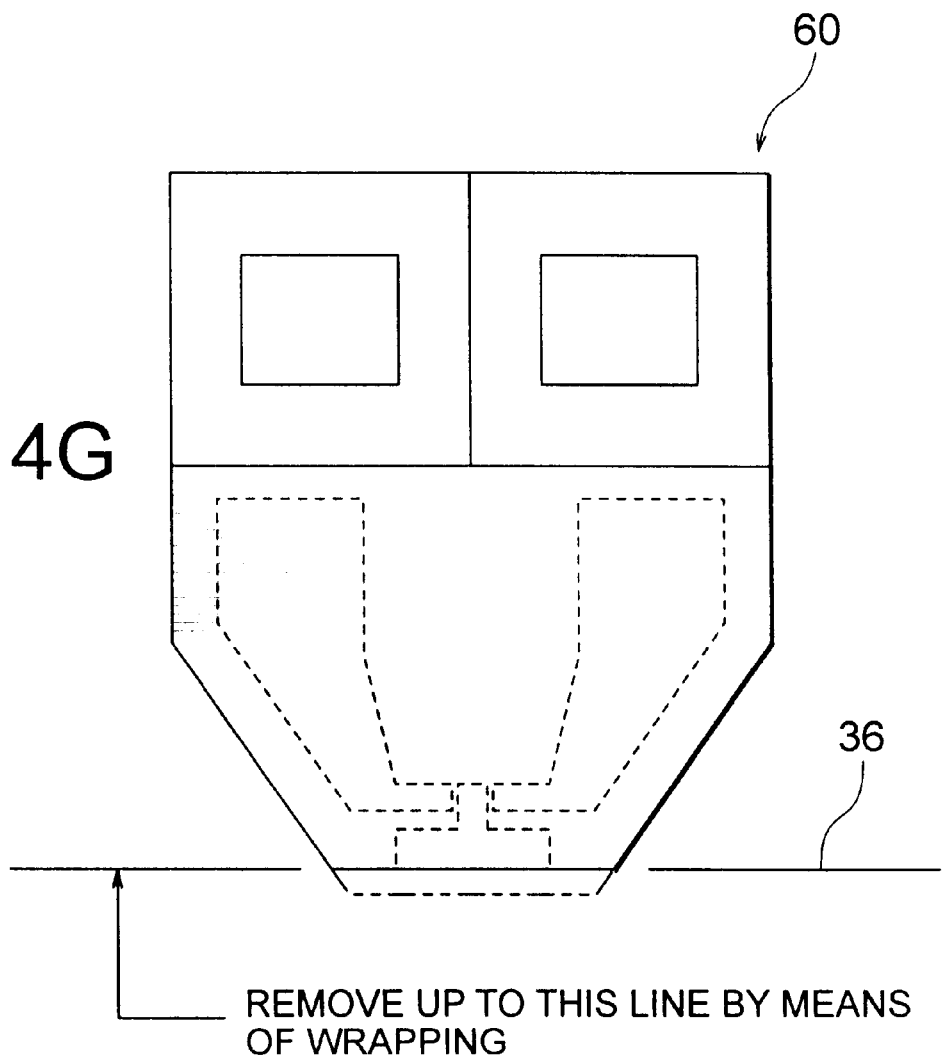
FIG. 4G is a plan view showing a method of manufacturing the ABS in the magnetic recording and reproducing head according to the embodiment.

Next, the substrate 62 (see FIG. 2) is cut into an adequate size. Thereafter, as shown in FIG. 4G, the substrate 62 is ground until the ABS 36 is exposed.

Next, the ABS 36 is worked to have an adequate form so as to take an optimum posture when the head operates. On the ABS 36, a protection material that is hard and rigid and has an excellent lubrication property, for example, a diamond-like carbon film or the like is formed in some cases. Thus, the magnetic recording and reproducing head 60 is formed. The magnetic recording and reproducing head 60 is worked as a slider and loaded in the magnetic storage device 80 (see FIG. 3).

Next, the operation of the magnetic storage device 80 of the embodiment shall be described. First, operation of the MR head 10 shall be described. When the magnetic storage device 80 (see FIG. 3) operates for reproduction, as shown in FIG. 1, a sense current for sensing changes in the electric resistance of the MR element 30 is made to flow from the upper electrode-cum-magnetic shield layer 28 to the lower electrode-cum-magnetic shield layer 12. At this time, the sense current flows to the upper electrode-cum-magnetic shield layer 28, upper layer 25, fixing layer 24, fixed magnetic layer 22, nonmagnetic layer 20, free magnetic layer 18, undercoat layer 17, magnetic gap adjusting layer 14, and lower electrode-cum-magnetic shield layer 12 in this order. At this time, the vertical bias layers 161 and 162 have no relation with the manner of this current flow.

In the condition where the sense current flows, when a leak magnetic field from the magnetic recording medium 82 (see FIG. 3) is applied to the MR head 10, the magnetization direction of the free magnetic layer 18 changes in accordance with the magnitude and direction of the leak magnetic field. When the magnetization direction of the free magnetic layer 18 changes, the resistance value of the MR element 30 changes, and the sense current changes. The change in this sense current is detected, whereby magnetic information recorded in the magnetic recording medium 82 can be sensed.

In addition, as shown in FIG. 3, in the magnetic storage device 80, a control signal outputted from the control unit 90 is inputted into the spindle motor 86, and then, the spindle motor 86 rotates the magnetic recording medium 82. In addition, a control signal outputted from the control unit 90 is inputted into the voice coil motor 84 to actuate the voice coil motor 84 and make the magnetic head 60 track on the magnetic recording medium 82 via the arm 94 and suspension 92. When the magnetic storage device 80 operates for reproduction, as mentioned above, the MR head 10 (see FIG. 2) of the magnetic head 60 senses the leak magnetic field from the magnetic recording medium 82 and outputs a signal to the control unit 90 via the recording and reproducing channel 88.

On the other hand, when the magnetic storage device 80 operates for recording, a control signal outputted from the control unit 90 is inputted into the recording and reproducing channel 88 to actuate the recording and reproducing channel 88, and a signal outputted from the recording and reproducing channel 88 is inputted into the magnetic head 60, whereby the recording head 34 (see FIG. 2) of the magnetic head 60 records information onto the magnetic recording medium 82.

In the embodiment, as shown in FIG. 1, since the magnetic gap adjusting layer 14 is provided between the free magnetic layer 18 and lower electrode-cum-magnetic shield layer 12, the free magnetic layer 18 as a magnetism sensing portion is not too close to the lower electrode-cum-magnetic shield layer 12, so that the leak magnetic field to be inputted into the free magnetic layer 18 can be prevented from weakening due to the magnetic shield effect of the lower electrode-cum-magnetic shield layer 12. Therefore, the leak magnetic field from the magnetic recording medium 82 can be sufficiently guided to the free magnetic layer 18. Thereby, the reproduction sensitivity of the MR head 10 increases and the reproduction output increases. Furthermore, since the shield proximity effect on the magnetostatic coupling between the free magnetic layer 18 and fixed magnetic layer 22 and the sense current can be removed, design of the bias structure for providing an optimum operating point becomes easier. As a result, output waveforms having excellent waveform symmetry without distortion can be obtained.

Furthermore, since the upper electrode-cum-magnetic shield layer 28 and lower electrode-cum-magnetic shield layer 12 function both as electrode layers and magnetic shield layers, the upper and lower magnetic gap can be eliminated, the space between the upper magnetic shield and lower magnetic shield can be made narrow, so that the recording bit density can be improved. Moreover, the vertical bias layers 161 and 162 do not exist at the current path in the MR head 10, and both end parts of the free magnetic layer 18 are directly connected to the vertical bias layers 161 and 162, the sense current securely flows in the MR element 30, and vertical bias magnetic fields from the vertical bias layers 161 and 162 are sufficiently applied to the free magnetic layer 18. Thereby, the MR head 10 can obtain stable characteristics.

For example, magnetic storage device of the embodiment may be a magnetic disk device. The magnetic disk device is equipped with three magnetic disks as magnetic recording mediums on the base, houses a head drive circuit, a signal processing circuit, and an input/output interface on the base back surface, and is connected to the outside by a bus line of 32 bits. 6 magnetic heads of the abovementioned magnetic disk device are disposed one by one on both surfaces of the magnetic disks. In addition, the magnetic disk device is loaded with a rotary actuator for driving the magnetic heads, a drive circuit and control circuits for the rotary actuator, and a spindle direct-connected motor for rotating disks.

The magnetic disk has a diameter of 46 mm, and a part from 5 mm to 20 mm from the magnetic disk center is used as a data recording surface. By employing an embedded-servo system, the magnetic disks have no servo surface, so that high density can be realized.

This magnetic disk device can be directly connected to a small-sized computer as an external storage device for the small-sized computer. Furthermore, the device is loaded with a cash memory at the input/output interface, the device can adapt to a bus line whose transfer rate is within a range from 5 to 20 megabytes per second. Moreover, by connecting a plurality of such magnetic disk devices by using external control units, a large-capacity magnetic disk device can be constructed.

Figure 5:
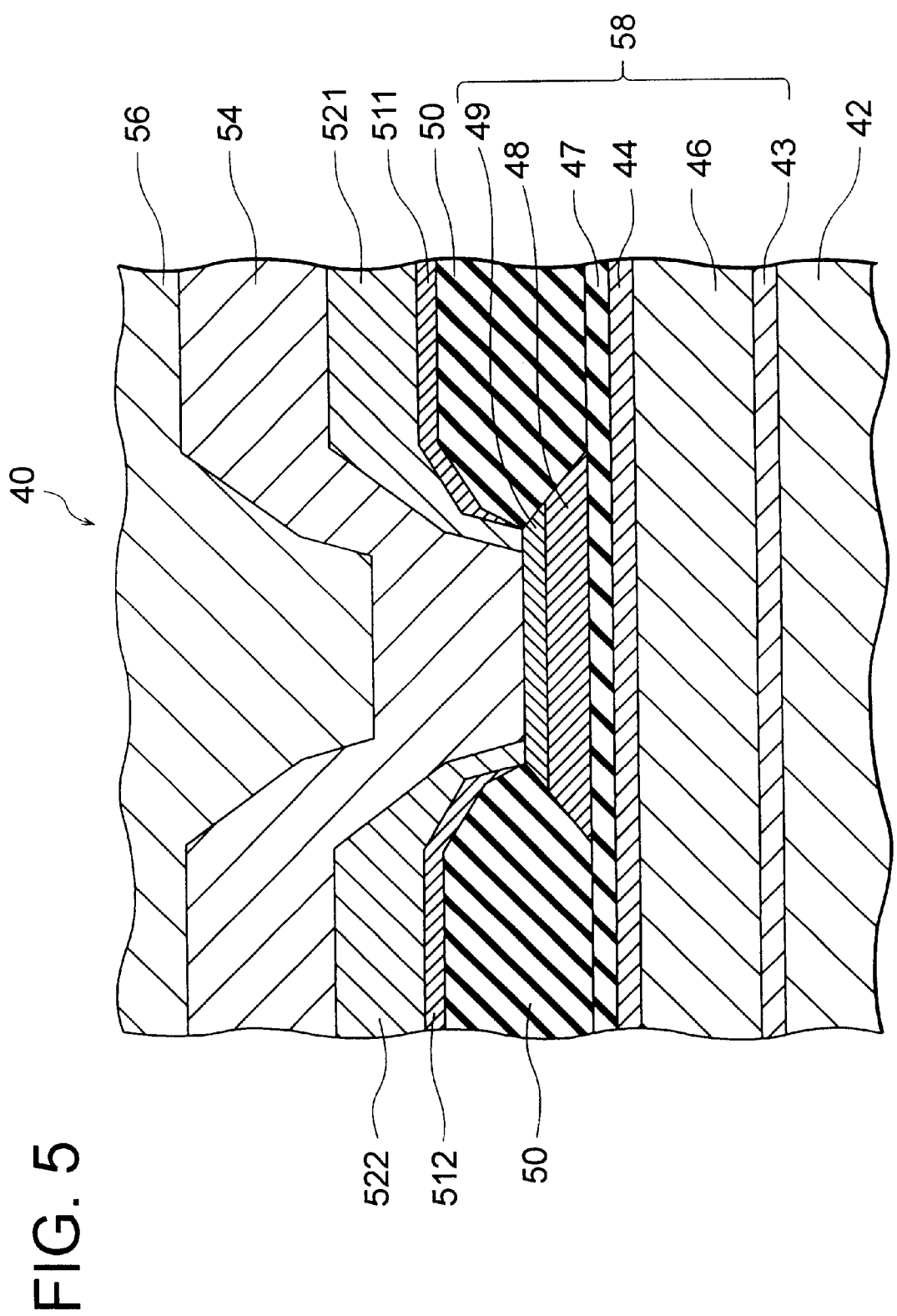
FIG. 5 is a sectional view in parallel with the ABS showing the construction of the MR head according to the second embodiment of the present invention.

Next, the second embodiment of the present invention shall be described. FIG. 5 is a sectional view in parallel with the ABS showing the construction of the MR head of the embodiment. As shown in FIG. 5, in an MR head 40 of the embodiment, lower electrode-cum-magnetic shield layer 42 is provided on the substrate (not shown), an undercoat layer 43 is provided on the lower electrode-cum-magnetic shield layer 42, a fixing layer 46 is provided on the undercoat layer 43, and a fixed magnetic layer 44 is provided on the fixing layer 46. The fixing layer 46 fixes the magnetization direction of the fixed magnetic layer 44. In addition, a nonmagnetic layer 47 is provided on the fixed magnetic layer 44, a free magnetic layer 48 is provided on a part of the nonmagnetic layer 47, and an upper layer 49 is provided on the free magnetic layer 48. The free magnetic layer 48 changes its magnetization direction depending on applied magnetic fields. An MR element 58 is comprised of the undercoat layer 43, fixing layer 46, fixed magnetic layer 44, nonmagnetic layer 47, free magnetic layer 48, and upper layer 49.

Furthermore, an insulation layer 50 is provided so as to fill the surrounding of the free magnetic layer 48, and a pair of vertical bias layers 521 and 522 is provided on the insulation layer 50 and both end parts of the upper layer 48. Vertical bias undercoat layers 511 and 522 are provided, respectively, between the vertical bias layer 521 and insulation layer 50 and between the vertical bias layer 522 and insulation layer 50. The vertical bias layers 521 and 522 face each other while sandwiching a space positioned above a portion of the upper layer 49 except at both end parts of the upper layer 49, and are contacted with the upper surfaces of left and right end parts of the upper layer 49, respectively. A magnetic gap adjusting layer 54 made of a nonmagnetic conductor is provided on the vertical bias layers 521 and 522 and upper layer 49, and an upper electrode-cum-magnetic shield layer 56 is provided on the magnetic gap adjusting layer 54.

In the embodiment, the MR head 40 in which only the free magnetic layer 48 and upper layer 49 are patterned in the MR element 58 is shown, however, at least the free magnetic layer 48 may be patterned in the MR element 58, and the depth to be patterned under the free magnetic layer 48 is properly selected. In addition, in a case where oxide is used as the material of the vertical bias layers 521 and 522, since the oxide itself is an insulation material, the insulation layer 50 deposited under the vertical bias layers 521 and 522 in FIG. 5 can be omitted.

The undercoat layer 43 and vertical bias undercoat layers 511 and 512 are omitted in some cases. Furthermore, in the MR element 58, MR enhanced layers in which the charge density is increased can be provided between the fixed magnetic layer 44 and nonmagnetic layer 47 and between the nonmagnetic layer 47 and free magnetic layer 48. By providing the MR enhanced layers, the MR ratio (magnetoresistive ratio) of the MR element 58 can be improved. The materials composing the respective layers are the same as those of the MR head 10 of the first embodiment.

The construction of the magnetic storage device of the embodiment except for the MR head 40 is the same as that of the magnetic storage device 80 of the first embodiment except for the MR head 10.

Next, the method of manufacturing the MR head 40 of the embodiment shall be described. As shown in FIG. 5, the lower electrode-cum-magnetic shield layer 42 is formed on the substrate (not shown) and patterned to be an adequate form. Next, the undercoat layer 43, the fixing layer 46, the fixed magnetic layer 44, and the nonmagnetic layer 47 are formed in this order on the lower electrode-cum-magnetic shield layer 42. At this time, although not shown in FIG. 5, the fixing layer 46, fixed magnetic layer 44, and nonmagnetic layer 47 are patterned to be adequate forms. Patterned free magnetic layer 48 and upper layer 49 are formed thereon as shown in FIG. 5. Next, the insulation layer 50 is formed so as to fill the surrounding of the free magnetic layer 48 and upper layer 49. Next, the vertical bias undercoat layers 511 and 512 are formed on the insulation layer 50, and the vertical bias layers 521 and 522 are formed on the vertical bias undercoat layers 511 and 512 and both end parts of the upper layer 49. The vertical bias layers 521 and 522 are formed so as to be contacted, respectively, with the left and right ends of the upper layer 49. Next, the magnetic gap adjusting layer 54 is formed on the vertical bias layers 521 and 522 and upper layer 49 and patterned to be adequate forms. Next, the upper electrode-cum-magnetic shield layer 56 is formed on the magnetic gap adjusting layer 54.

The method of manufacturing the magnetic storage device of the embodiment excluding the MR head 40 is the same as that of the magnetic storage device 80 of the first embodiment excluding the MR head 10.

Next, the operation of the MR head 40 of the embodiment shall be described. A sense current for sensing changes in the electric resistance of the MR element 58 is made to flow from the upper electrode-cum-magnetic shield layer 56 to the lower electrode-cum-magnetic shield layer 42. At this time, the sense current flows to the upper electrode-cum-magnetic shield layer 56, magnetic gap adjusting layer 54, upper layer 49, free magnetic layer 48, nonmagnetic layer 47, fixed magnetic layer 44, fixing layer 46, undercoat layer 43, and lower electrode-cum-magnetic shield layer 42 in this order. At this time, the vertical bias layers 521 and 522 are electrically insulated from the fixed magnetic layer 44 and layers under the fixed magnetic layer 44 by the insulation layer 50 and nonmagnetic layer 47, so that the vertical bias layers 521 and 522 do not influence the manner of this current flow.

In a condition where the sense current flows, when a leak magnetic field from the magnetic recording medium (not shown) is applied to the MR head 40, the magnetization direction of the free magnetic layer 48 changes in accordance with the magnitude and direction of this leak magnetic field. When the magnetization direction of the free magnetic layer 48 changes, the resistance value of the MR element 58 changes, and accordingly, the sense current changes. This change in the sense current is detected, whereby magnetic information recorded in the magnetic recording medium can be sensed.

The operations of the magnetic storage device of the embodiment excluding the MR head 40 are the same as those of the magnetic storage device 80 of the first embodiment excluding the MR head 10.

In the embodiment, since the fixing layer 46 whose thickness is thicker than the other layers in the MR element 58 is not patterned, the manufacturing of the MR head 40 is easier than the MR head 10 of the first embodiment. And, since the magnetic gap adjusting layer 54 is provided between the free magnetic layer 48 and upper electrode-cum-magnetic shield layer 56, the free magnetic layer 48 can be arranged at a fixed distance away from the upper electrode-cum-magnetic shield layer 56. Therefore, the magnetic field to be inputted into the free magnetic layer 48 can be prevented from weakening due to the magnetic shield effect of the upper electrode-cum-magnetic shield layer 56, so that the leak magnetic field from the magnetic recording medium can be sufficiently guided to the free magnetic layer 48. Thereby, the reproduction sensitivity of the MR head 40 increases and the reproduction output is improved. In addition, since the shield proximity effect on the magnetostatic coupling between the free magnetic layer 48 and fixed magnetic layer 44 and the sense current can be eliminated, design of the bias structure for providing an optimum operating point becomes easier. As a result, output waveforms having excellent waveform symmetry without distortion can be obtained.

Furthermore, since the upper electrode-cum-magnetic shield layer 56 and lower electrode-cum-magnetic shield layer 42 function both electrode layers and magnetic shield layers, the upper and lower magnetic gap can be omitted, the space between the upper magnetic shield and lower magnetic shield can be narrowed, and the recording bit density can be improved. Moreover, the vertical bias layers 521 and 522 do not exist at the current path of the sense current in the MR element 40 and are contacted with both end parts of the thin upper layer 49, and the upper layer 49 is contacted with the free magnetic layer 48, so that the sense current securely flow to the MR element 58, and vertical bias magnetic fields from the vertical bias layers 521 and 522 are sufficiently applied to the free magnetic layer 48. Thereby, the MR head 40 can obtain stable characteristics.

Next, a variation of the embodiment shall be described. In this variation, in the MR element, two portions composed of the fixing layer, fixed magnetic layer, and non magnetic layer are provided, and are disposed so as to sandwich the free magnetic layer. That is, the MR element is comprised of, in order from the side of the lower electrode-cum-magnetic shield layer, an undercoat layer, a first fixing layer, a first fixed magnetic layer, a first nonmagnetic layer, a free magnetic layer, a second non magnetic layer, a second fixed magnetic layer, a second fixing layer, and an upper layer. Thereby, since two magnetostatic couplings are formed between the free magnetic layers and fixed magnetic layers, the detection sensitivity for magnetic fields can be increased. In addition, in this MR element, MR enhanced layers can be provided at both sides of the first and second nonmagnetic layers, that is, a construction can be employed in which an undercoat layer, a first fixing layer, a first fixed magnetic layer, a first MR enhanced layer, a first nonmagnetic layer, a second MR enhanced layer, a free magnetic layer, a third MR enhanced layer, a second nonmagnetic layer, a fourth MR enhanced layer, a second fixed magnetic layer, a second fixing layer, and an upper layer are provided in order from the side of the lower electrode-cum-magnetic shield layer. The construction of the variation except for the MR element is the same as that of the second embodiment.

Hereinafter, the example of the present invention shall be described in detail by comparing them with a comparative example deviating from the scope of the present invention. A magnetic head was manufactured by using the MR head 10 shown in FIG. 1. As components comprising the MR element, the materials shown below were used. The number shown after each symbol for an element indicates the composition of the element, and the case where no number is shown indicates a simple substance.

Lower layer: Ta (3 nm thick)

Free magnetic layer: Ni 82 atomic %—Fe 18 atomic % (4 nm thick)

MR enhanced layer: Co 90 atomic %—Fe 10 atomic % (0.5 nm thick)

Nonmagnetic layer: Al oxide as an insulation barrier layer (0.7 nm thick)

MR enhanced layer: Co 40 atomic %—Fe 60 atomic % (2 nm thick)

Fixed magnetic layer: 2-layered film of Ru (0.6 nm thick) and Co 40 atomic %—Fe 60 atomic % (1.5 nm thick)

Fixing layer: Ir 20 atomic %—Mn 80 atomic % (20 nm thick)

Upper layer: Ta (3 nm thick)

After forming the MR element, heat treatment at 230° C. for 5 hours was carried out while applying a magnetic field of 790 kA/m in the direction orthogonal to the magnetic field when depositing layers. In the patterning of the MR element, milling was stopped at the middle of the nonmagnetic layer (insulation barrier layer), and a (lower) part of the insulation barrier layer and the free magnetic layer were not patterned. The patterning at this time was carried out in an atmosphere of pure Ar gas at a pressure of 0.3 Pa by using a normal milling device. The milling is carried out from the direction perpendicular to the layer surface.

Next, the components of the magnetic head of the example shall be described. As a comparative example, a prior-art MR head in which the magnetic gap adjusting layer was not provided was also manufactured.

1. Substrate

Formed by laminating alumina with a thickness of 3 μm on alumina titanium carbide with a thickness of 1.2 mm.

2. MR head part (reproducing head part)

Lower electrode-cum-magnetic shield layer: Co 89 atomic %—Zr 4 atomic %—Ta 4 atomic %—Cr 3 atomic % (1 μm)

Magnetic gap adjusting layer: Ta (24 nm thick) (only in the example)

Insulation layer: alumina (40 nm thick)

Vertical bias undercoat layers: Cr (10 nm thick)

Vertical bias layers: Co 74.5 atomic %—Cr 10.5 atomic %—Pt 15 atomic % (24 nm thick)

Upper electrode-cum-magnetic shield layer: Common with the recording head lower pole (common pole)

Electrode terminal: 2-layered film of Ta (3 nm thick) and Au (3 μm thick)

3. Recording head part

Common pole undercoat: Ni 82 atomic %—Fe 18 atomic % (90 nm thick)

Common pole: 2-layered film of Ni 82 atomic %—Fe 18 atomic % (2.54 μm thick) and Co 65 atomic %—Ni 12 atomic %—Fe 23 atomic % (0.5 μm thick)

Recording magnetic gap: alumina (0.2 μm thick)

Magnetic gap thick-coating: alumina (0.7 μm thick)

Coil undercoat: 2-layered film of Cr (30 nm thick) and Cu (150 nm thick)

Coil: Cu (4.5 μm thick)

Upper pole undercoat: 2-layered film of Ti (10 nm thick) and Co 65 atomic %—Ni 12 atomic %—Fe 23 atomic % (0.1 μm thick)

Upper pole: 2-layered film of Co 65 atomic %—Ni 12 atomic %—Fe 23 atomic % (0.5 μm thick) and Ni 82 atomic %—Fe 18 atomic % (3.5 μm thick)

Terminal undercoat: 2-layered film of Cr (30 nm thick) and Cu (150 nm thick)

Terminal: Cu (50 μm thick)

Overcoat: alumina (52 μm thick)

Gold terminal undercoat: 2-layered film of Ti (10 nm thick) and Ni 82 atomic %—Fe 18 atomic % (0.1 μm thick)

Gold terminal: Au (3 μm thick)

Next, the method of manufacturing the magnetic heads of the example and the comparative example shall be described. The method of manufacturing the reproducing head part is as follows. After washing the substrate, the lower electrode-cum-magnetic shield layer was deposited and annealed. Next, a PR was formed and patterned, and then an alignment mark was formed and removed the PR. Next, the lower electrode-cum-magnetic shield layer was patterned by forming a PR, tapering, and then removing the PR. Next, the magnetic gap adjusting layer was deposited and formed by forming a PR, means of milling, removing the PR, and the vertical bias layers were deposited and formed by forming a PR and lifting-off. Next, the layers of the MR element were deposited and formed by forming a PR and milling it up to the insulation barrier layer (the non-magnetic layers). Next, the insulation layer was deposited and formed by means of lifting-off, the upper electrode-cum-magnetic shield layer was deposited and formed by means of lifting-off upon forming a PR to constitute its film, and a pole height monitor was formed by forming a PR, depositing, and lifting-off. Next, a PR was formed and milled, a terminal material was deposited, and then the PR was removed, whereby the lower electrode terminal was formed. Also, a PR was formed, a terminal material was deposited, and then the PR was removed, whereby the upper electrode terminal was formed.

The method of manufacturing the recording head part is as follows. The second undercoat was deposited, a frame PR was formed, the common pole was plated, a cover PR was formed, means of chemical etching, and the undercoat was removed, whereby the common pole was formed. A pole height filling resist was formed, a magnetic gap was deposited, and a magnetic gap thick-coating was formed by forming a PR, depositing, and lifting-off the PR, and a PW, that is, a pole for magnetically connecting the upper pole and common pole was formed by forming a PR, means of milling, and removing the PR. Next, a coil forming an SC1 resist, that is, a first resist for securing insulation of the coil was formed. Next, a coil was formed by depositing the undercoat, forming a PR, plating the coil, means of chemical etching, and removing the undercoat. A SC2 resist, that is, a second resist for securing insulation of the coil was formed, the magnetic gap was adjusted by milling, the upper pole was formed by depositing the undercoat, forming a frame resist, plating and annealing the upper pole, removing the undercoat, forming a cover PR, means of chemical etching, and removing the undercoat. Next, a terminal was formed by depositing the undercoat, forming a PR, plating the terminal, means of chemical etching, and removing the undercoat. An overcoat was deposited, a terminal wrap was formed, and a gold terminal plating was formed by depositing an undercoat, forming a PR, plating the gold terminal, and removing the undercoat.

Furthermore, as post-processes, the magnetic head was cut in rows, the ABS was wrapped, and DLC (diamond-like carbon) was deposited on the ABS, and the magnet head was slider-worked and attached to the suspension.

Next, the reproduction characteristics of the magnetic heads of the example and the comparative example shall be described. 2 types of magnetic heads of the example provided with magnetic gap adjusting layer, and of a comparative example without providing the magnetic gap adjusting layer were prepared by 30 for each type. By using these magnetic heads, data was recorded onto and reproduced from a CoCrTa-base magnetic recording medium. At this time, the writing track width was 3 μm, the reading track width was 2 μm. The photoresist curing process when manufacturing the coil of the recording head part was carried out at 220° C. for 2 hours. The coercive force of the magnetic recording medium was 395 kA/m, and the Mrt (the product of residual magnetization and film thickness) was 0.35 memu/cm$^2$. The average reproduction outputs and waveform symmetries of the thirty magnetic heads provided with the magnetic gap adjusting layers (example) and the thirty magnetic heads having no magnetic gap adjusting layers (comparative example) are as follows.

With magnetic gap adjusting layer: 2.4 mV reproduction output, 48% waveform symmetry Without magnetic gap adjusting layer: 1.6 mV reproduction output, 42% waveform symmetry.

The example, that is, the magnetic head provided with the magnetic gap adjusting layer was high in reproduction output and excellent in waveform symmetry in comparison with the comparative example, that is, the magnetic head having no magnetic gap adjusting layer provided. The magnetic gap adjusting layer prevented the free magnetic layer from being too close to the electrode-cum-magnetic shield layer, and as a result, the leak magnetic field from the magnetic recording medium became able to more efficiently flow into the free magnetic layer, so that such excellent reproduction characteristics were obtained.

What is claimed is:

1. A magneto-resistance effect head, comprising:
    a magneto-resistance effect element whose resistance value changes depending on applied magnetic fields, said magneto-resistance effect element comprising
        a free magnetic layer whose magnetization direction changes depending on applied magnetic fields,
        a nonmagnetic layer,
        a fixed magnetic layer whose magnetization direction is fixed, and
        a fixing layer for fixing the magnetization direction of the fixed magnetic layer;
    a first electrode-cum-magnetic shield layer which is disposed at the free magnetic layer side of the magneto-resistance effect element and functions both as electrode and magnetic shield of the magneto-resistance effect element;
    a second electrode-cum-magnetic shield layer which is disposed at the fixing layer side of the magneto-resistance effect element and functions both as electrode and magnetic shield of the magneto-resistance effect element; and
    a magnetic gap adjusting layer which is made of a nonmagnetic conductor and provided between the free magnetic layer and the first electrode-cum-magnetic shield layer, wherein the first and second electrodes-cum-magnetic shield layers, the free magnetic layer, the nonmagnetic layer, the fixed magnetic layer, and the fixing layer are laminated in one direction,
        further comprising a protection layer between the free magnetic layer and the magnetic gap adjusting layer.

2. A magneto-resistance effect head, comprising:
    a lower electrode-cum-magnetic shield layer;
    a magnetic gap adjusting layer, which is made of a nonmagnetic conductor and formed on the lower electrode-cum-magnetic shield layer;
    a pair of vertical bias layers formed on the magnetic gap adjusting layer via a space;
    a free magnetic layer which is formed in the space above the magnetic gap adjusting layer so that both end parts are contacted with the vertical bias layers, and changes its magnetization direction depending on applied magnetic fields;
    a nonmagnetic layer formed on the free magnetic layer;
    a fixed magnetic layer which is formed on the non magnetic layer and whose magnetization direction is fixed;
    a fixing layer, which is formed on the fixed magnetic layer and fixes the magnetization direction of the fixed magnetic layer;
    an insulation layer formed so as to fill the surrounding of the fixed magnetic layer and the fixing layer; and
    an upper electrode-cum-magnetic shield layer formed on the insulation layer and the fixing layer.

3. A magneto-resistance effect head, comprising:
    a lower electrode-cum-magnetic shield layer;
    a fixing layer formed on the lower electrode-cum-magnetic shield layer;
    a fixed magnetic layer which is formed on the fixing layer and whose magnetization direction is fixed by the fixing layer;
    a nonmagnetic layer formed on the fixed magnetic layer;
    a free magnetic layer, which is formed on a part of the nonmagnetic layer and changes its magnetization direction depending on applied magnetic fields;
    an insulation layer formed so as to fill the surrounding of the free magnetic layer;
    a pair of vertical bias layers which is formed on the insulation layer so as to be contacted with both end parts of the free magnetic layer and apply magnetic fields to the free magnetic layer;
    a magnetic gap adjusting layer which is made of a nonmagnetic conductor and formed on the pair of vertical bias layers and the free magnetic layer; and
    an upper electrode-cum-magnetic shield layer formed on the magnetic gap adjusting layer.

4. A magneto-resistance effect head, comprising:
    a magneto-resistance effect element whose resistance value changes depending on applied magnetic fields, said magneto-resistance effect element comprising
        a free magnetic layer whose magnetization direction changes depending on applied magnetic fields,
        a nonmagnetic layer,
        a fixed magnetic layer whose magnetization direction is fixed, and
        a fixing layer for fixing the magnetization direction of the fixed magnetic layer;
    a first electrode-cum-magnetic shield layer which is disposed at the free magnetic layer side of the magneto-resistance effect element and functions both as electrode and magnetic shield of the magneto-resistance effect element;
    a second electrode-cum-magnetic shield layer which is disposed at the fixing layer side of the magneto-resistance effect element and functions both as electrode and magnetic shield of the magneto-resistance effect element; and a magnetic gap adjusting layer which is made of a nonmagnetic conductor and provided between the free magnetic layer and the first electrode-cum-magnetic shield layer, wherein the first and second electrodes-cum-magnetic shield layers, the free magnetic layer, the nonmagnetic layer, the fixed magnetic layer, and the fixing layer are in one direction, further comprising an undercoat between the free magnetic layer and the magnetic gap adjusting layer.

5. A magneto-resistance effect device comprising:

a magneto-resistance effect element whose resistance value changes depending on applied magnetic fields, said magneto-resistance effect element comprising
a free magnetic layer whose magnetization direction changes depending on applied magnetic fields,
a nonmagnetic layer,
a fixed magnetic layer whose magnetization direction is fixed, and
a fixing layer for fixing the magnetization direction of the fixed magnetic layer;

a first electrode-cum-magnetic shield layer which is disposed at the free magnetic layer side of the magneto-resistance effect element and, functions both as electrode and magnetic shield of the magneto-resistance effect element;

a second electrode-cum-magnetic shield layer which is disposed at the fixing layer side of the magneto-resistance effect element and functions both as electrode and magnetic shield of the magneto-resistance effect element; and a magnetic gap adjusting layer which is made of a nonmagnetic conductor and provided between the free magnetic layer and the first electrode-cum-magnetic shield layer, wherein the first and second electrodes-cum-magnetic shield layers, the free magnetic layer, the nonmagnetic layer, the fixed magnetic layer, and the fixing layer are laminated in one direction, and a protection layer between the free magnetic layer and the magnetic gap adjusting layer.

6. A magneto-resistance effect device, comprising:

a lower electrode-cum-magnetic shield layer;

a magnetic gap adjusting layer, which is made of a nonmagnetic conductor and formed on the lower electrode-cum-magnetic shield layer;

a pair of vertical bias layers formed on the magnetic gap adjusting layer via a space;

a free magnetic layer which is formed in the space above the magnetic gap adjusting layer so that both end parts are contacted with the vertical bias layers, and changes its magnetization direction depending on applied magnetic fields;

a nonmagnetic layer formed on the free magnetic layer;

a fixed magnetic layer which is formed on the nonmagnetic layer and whose magnetization direction is fixed;

a fixing layer, which is formed on the fixed magnetic layer and fixes the magnetization direction of the fixed magnetic layer;

an insulation layer formed so as to fill the surrounding of the fixed magnetic layer and the fixing layer; and an upper electrode-cum-magnetic shield layer formed on the insulation layer and the fixing layer.

7. A magneto-resistance effect device, comprising:

a lower electrode-cum-magnetic shield layer;

a fixing layer formed on the lower electrode-cum-magnetic shield layer a fixed magnetic layer which is formed on the fixing layer and whose magnetization direction is fixed by the fixing layer;

a nonmagnetic layer formed on the free magnetic layer;

a free magnetic layer, which is formed on a part of the nonmagnetic layer and changes its magnetization direction depending on applied magnetic fields;

an insulation layer formed so as to fill the surrounding of the free magnetic layer;

a pair of vertical bias layers which is formed on the insulation layer so as to be contacted with both end parts of the free magnetic layer and apply magnetic fields to the free magnetic layer;

a magnetic gap-adjusting layer which is made of a nonmagnetic conductor and formed on the pair of vertical bias layers and the free magnetic layer; and an upper electrode-cum-magnetic shield layer formed on the magnetic gap adjusting layer.

8. A magneto-resistance effect device comprising:

a magneto-resistance effect element whose resistance value changes depending on applied magnetic fields, said magneto-resistance effect element comprising
a free magnetic layer whose magnetization direction changes depending on applied magnetic fields,
a nonmagnetic layer,
a fixed magnetic layer whose magnetization direction is fixed, and
a fixing layer for fixing the magnetization direction of the fixed magnetic layer;

a first electrode-cum-magnetic shield layer which is disposed at the free magnetic layer side of the magneto-resistance effect element and, functions both as electrode and magnetic shield of the magneto-resistance effect element;

a second electrode-cum-magnetic shield layer which is disposed at the fixing layer side of the magneto-resistance effect element and functions both as electrode and magnetic shield of the magneto-resistance effect element; and a magnetic gap adjusting layer which is made of a nonmagnetic conductor and provided between the free magnetic layer and the first electrode-cum-magnetic shield layer, wherein the first and second electrodes-cum-magnetic shield layers, the free magnetic layer, the nonmagnetic layer, the fixed magnetic layer, and the fixing layer are laminated in one direction, further comprising an undercoat layer between the free magnetic layer and the magnetic gap adjusting layer.

* * * * *